June 18, 1940.  H. F. M. ROUSE  2,204,950
AIR-LINE LUBRICATOR
Filed Oct. 6, 1939

Inventor
Horace F. M. Rouse
by his Attorney
Francis C. Boyce

Patented June 18, 1940

2,204,950

UNITED STATES PATENT OFFICE 2,204,950

AIR-LINE LUBRICATOR

Horace Frederick Macdonald Rouse, Johannesburg, Transvaal, Union of South Africa Application October 6, 1938, Serial No. 233,537
In the Union of South Africa October 14, 1937

7 Claims. (Cl. 184—55)

This invention relates to lubricators and more particularly to "air-line" lubricators.

An "air-line" lubricator comprises a closed container for a liquid lubricant or oil, communicating by means of a small orifice or passage, with the air pipe supplying compressed air to the air operated mechanism it is desired to lubricate.

It is well known that such lubricators, from the said orifice and under nominal working conditions, slowly exude oil which is taken up by the air stream.

When, however, such a lubricator is disconnected from the air-line or should the pressure in the air-line drop considerably, the lubricant in the container is liable to be expelled relatively rapidly thus causing wastage. This is due to the expansion of the body of air accumulated under pressure in the container and above the oil. To overcome this difficulty a loaded valve in the nozzle may be provided to prevent, automatically, the excessive escape of the oil, but to avoid complications, and, at the same time, make the apparatus more efficient, according to this invention, spring controlled valves are avoided.

It is the object of the present invention to provide an efficient air-line lubricator which will supply a minute but regular supply of lubricant under working conditions and which will not waste oil when disconnected from the air-line or when the air pressure fails.

A further object is so to design the lubricator that it will operate in any position and, by avoiding all surface projections in its construction will not be damaged when moved over the rough surfaces in the mine.

The invention is illustrated, in the preferred form, in the accompanying drawing, in which.

Figure 1:
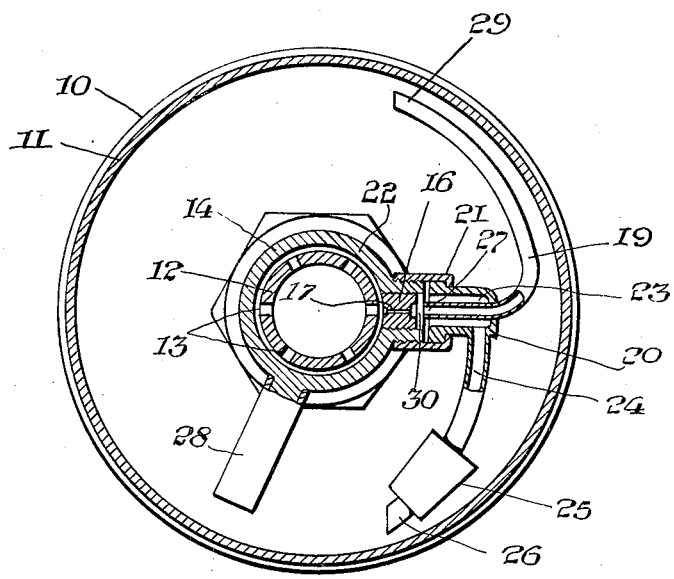
Fig. 1 is a sectional elevation of the lubricator.
Figure 2:
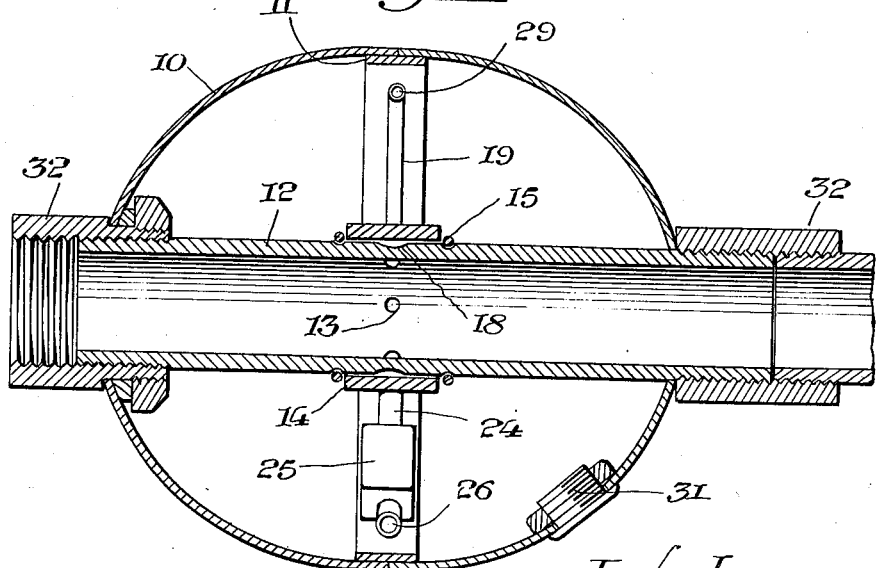
Fig. 2 is a view at right angles to Fig. 1.

10 is the container for the oil supply and housing for the lubricator. It is provided with a joint ring 11. 12 is a tube forming part of the air-line and 13 the lubricating holes therein.

The lubricator is mounted on the collar 14 which is slipped onto the tube 12 and rotatably locked in place by snap rings 15. The collar 14 is provided with a nozzle 16 having a very small orifice 17. This orifice communicates with the annular space 18 and so through the holes 13 to the air-line. The space 18 may be bevelled to drain towards the holes 13.

Just above the orifice 17 is an air-pipe 19 curved to lie near to the inside periphery of the container 10 for the purpose hereafter mentioned.

The pipe 19 is of small bore but larger by several times the area of the orifice 17. Around the lower end of pipe 19 is the closed sleeve 20 which is rotatably secured by nut 21 to the nipple 22 containing the nozzle 16. There is thus a space 23 round the pipe 19 communicating with the oil supply pipe 24. The oil pipe 24 preferably has a bore several times bigger than that of the air-pipe 19. This fitting 20 carries therefore both the air-pipe 19 and the oil pipe 24 projecting in opposite directions therefrom and is free to revolve about an axis generally, and as shown, at right angles to the axis of the air-line 12. The oil pipe 24 is curved and weighted at 25 so that its end 26 will lie close to the inside wall of the container 10 and on the opposite side of sleeve 20 to the air pipe 19. It will be observed that the end of pipe 19 terminates at 27 which is close to the opening of the orifice 17, and a little distance beyond the oil space 23.

The counter-weight 28 projecting from the collar 14 serves to keep the lubricator in its proper position and allow the end 26 of the oil pipe 24 to dip into the oil, no matter what the position of the device as a whole.

The action of the lubricator is as follows. Assuming that the air supply is connected to the pipe 12 and passing therethrough to drive a rock drill or other air-driven device. The air pressure will be pulsating due to the variations in consumption. The weights 28, and 25 on pipe 24, will co-operate to keep the end 26 in the oil whilst the air pipe 19 will have its outlet 29 above the oil and in any air space that exists in the container no matter what the position of the container.

Air from the air line will pass through the tube 12 and up the orifice 17, through the pipe 19 into the container 10 and will form a pressure therein, the pressure tending to equal the pressure in the air line 12. As soon as the pulsations allow the pressure in the air line 12 to fall, pressure on the oil in the pipe 24 will be released causing the oil to surge up the pipe and into the space 23. The air pressure on the surface of the oil in the container will assist this upward surge. The oil in the space 23 will tend to fill the space 30 and so cover the face of the orifice 17. The air pressure in the air pipe 19 will escape from the end 27 and in doing so will blow the drop of oil down and through the orifice 17 and so into the air line 12.

All the air escaping from the end 27 will not find its way down the orifice 17, part will escape and cut a passage through the oil drop filling the space 30. Thus the air will cut off the flow of oil and so prevent any ejector action. The container will be relieved of air pressure or the pressure in the container 10 will balance the pressure in the air line 12, and the oil film 30 over the orifice 17 will be remade so that no air without the extra pressure to break this film can enter the container 10; consequently the oil will not leak therefrom. The pressure of the air in the container 10 will pulsate in unison with the pulsations of the air in the air line 12. The oil in the container 10 will therefore be subjected to a variation of air pressure which will reciprocate the oil in pipe 24.

An oil film that covers the orifice 17 will be in the path of the air which escapes from the container so that the film of oil in space 30 will be broken by the excess air and the escaping air will spit a small particle of oil from the film 30 through the orifice 17, space 18, holes 13 and into the air-line 12. This action will tend to operate in harmony with the pulsations of the air in the pipe line.

The container 10 may be supplied with oil through the aperture 31. If desired this aperture 31 may be plugged by an "alemite" buttonhead airtight lubricating fitting, not shown, but which is well known in the trade, and which incorporates a spring controlling an outwardly closing valve, which, by the operation of a lubricant supply gun, allows a stream of lubricant under pressure to be injected into the chamber. Thereafter the aperture automatically closes with the withdrawal of the gun.

The lubricator may be provided with sockets 32 at each end to enable it to be inserted into the pipe line.

It will be understood that it will not matter in which direction the air flows through the tube 12 nor in what position the lubricator may lie, in fact, if the lubricator has the tube 12 hanging vertically the lubricator will still function, and the oil will not waste when the pressure in the air line fails.

What I claim as new and desire to secure by Letters Patent is:

1. A lubricator adapted for insertion into an air line comprising a container for the lubricant surrounding the air line; a nozzle opening into a narrow passage between a tube communicating with the air space in the container above the oil and a tube communicating with the oil in the container, and balance weights to maintain the parts in proper operative position.

2. An "air-line" lubricator consisting of a container, a nozzle for feeding lubricant from the container to the air-line, means at the inward side of the nozzle for controlling the flow of lubricant through the nozzle said means comprising an air pipe and an oil pipe both communicating with the same housing covering the nozzle and so mounted that, in all positions of the container, the oil pipe terminates in the lower part of the container whilst the air pipe terminates in the upper part thereof.

3. An "air-line" lubricator consisting of a container, a nozzle for feeding lubricant from the container to the air-line, means at the inward side of the nozzle for controlling the flow of lubricant through the nozzle said means comprising an air pipe the bore of the air tube being larger than the bore of the nozzle and an oil pipe both communicating with the same housing covering the nozzle and so mounted that, in all positions of the container, the oil pipe terminates in the lower part of the container whilst the air pipe terminates in the upper part thereof.

4. An "air-line" lubricator consisting of a container, a nozzle for feeding lubricant from the container to the air line, means at the inward side of the nozzle, for controlling the flow of lubricant through the nozzle said means comprising an air pipe and an oil pipe in which the bore of the oil tube is larger than the bore of the air tube, both communicating with the same housing covering the nozzle and so mounted that, in all positions of the container, the oil pipe terminates in the lower part of the container whilst the air pipe terminates in the upper part thereof.

5. A lubricator adapted for insertion into an air-line comprising a container, a nozzle joining the air-line and the container for feeding the lubricant from the container into the air line, means on the container side of the nozzle for directing air from the air line to the air space in the container and also for conveying oil from the container to the nozzle, a narrow space over said nozzle through which the air passes and connected to the oil supply and weights on said means to swing and maintain it in proper functioning position.

6. A lubricator adapted for insertion into an air-line, comprising a container, a nozzle joining the air-line and the container for feeding the lubricant from the container into the air-line and also for conveying air from the air-line into the container, means on the container side of the nozzle for directing the air from the air-line to the air space in the container and also for conveying oil from the container to the nozzle and weights on said means to swing it into and maintain it in proper functioning position.

7. A lubricator adapted for insertion into an air-line comprising a container, a nozzle for joining the air-line and the container, means forming an enclosed space at the container side of the nozzle and with which it communicates, a tube in proximity to the nozzle for conveying pulsations passing from the air in the air-line through the nozzle to the interior of the container and a passage for the oil between said air tube and the inlet of the nozzle and balance weights to maintain the parts in proper operative position.

HORACE FREDERICK
MACDONALD ROUSE.